United States Patent
Ley et al.

(10) Patent No.: US 7,755,244 B2
(45) Date of Patent: Jul. 13, 2010

(54) STATOR FOR PERMANENT MAGNET ELECTRIC MOTOR USING SOFT MAGNETIC COMPOSITES

(75) Inventors: Josh Ley, Erie, CO (US); Victor Chieduko, Lakewood, CO (US); Jeff Frazzini, Brighton, CO (US); Kevin Lewis, Littleton, CO (US); Philip Caffery, Boulder, CO (US)

(73) Assignee: UQM Technologies, Inc., Frederick, CO (US)

( * ) Notice: Subject to any disclaimer, the term of this patent is extended or adjusted under 35 U.S.C. 154(b) by 283 days.

(21) Appl. No.: 11/747,451

(22) Filed: May 11, 2007

(65) Prior Publication Data

US 2008/0278020 A1 Nov. 13, 2008

(51) Int. Cl.
H02K 1/14 (2006.01)
H02K 3/00 (2006.01)

(52) U.S. Cl. .................. 310/216.019; 310/216.074; 310/216.079; 310/216.127; 310/201; 310/208

(58) Field of Classification Search .......... 310/216, 310/218, 254, 201, 206, 208, 156.01, 156.45, 310/156.32–156.38, 216.019, 216.074, 216.079, 310/216.127, 265–266
See application file for complete search history.

(56) References Cited

U.S. PATENT DOCUMENTS

| | | | |
|---|---|---|---|
| 5,796,193 A | 8/1998 | Sakano et al. | |
| 5,801,473 A * | 9/1998 | Helwig | 310/254 |
| 5,894,902 A | 4/1999 | Cho | |
| 6,762,525 B1 * | 7/2004 | Maslov et al. | 310/112 |
| 6,791,222 B1 * | 9/2004 | Maslov et al. | 310/156.38 |
| 6,809,453 B2 * | 10/2004 | Narita et al. | 310/216 |
| 6,849,985 B2 | 2/2005 | Jack et al. | |
| 6,891,306 B1 | 5/2005 | Soghomonian et al. | |
| 6,924,574 B2 | 8/2005 | Qu et al. | |
| 6,956,307 B2 | 10/2005 | Enquist et al. | |
| 7,005,764 B2 | 2/2006 | Petersen | |
| 7,034,422 B2 | 4/2006 | Ramu | |
| 7,067,950 B2 * | 6/2006 | Hirzel et al. | 310/216 |
| 7,105,975 B2 * | 9/2006 | Semones et al. | 310/216 |
| 7,148,782 B2 * | 12/2006 | Hirzel | 336/212 |
| 7,155,804 B2 | 1/2007 | Calico | |
| 2005/0162034 A1 | 7/2005 | Soghomonian | |
| 2006/0113849 A1 | 6/2006 | Enomoto et al. | |
| 2007/0228860 A1 * | 10/2007 | Rao | 310/156.37 |

OTHER PUBLICATIONS

Office Action dated Jul. 31, 2009 and issued in corresponding CA Patent Application No. 2,615,111.
Alan G. Jack et al., "Permanent-Magnet Machines with Powdered Iron Cores and Prepressed Windings", IEEE Transactions on Industry Applications, vol. 36, No. 4, Jul./Aug. 2000, pp. 1077-1084.

* cited by examiner

*Primary Examiner*—Tran N Nguyen
(74) *Attorney, Agent, or Firm*—Buchanan Ingersoll & Rooney PC

(57) ABSTRACT

A stator of an electrical machine operable as a motor or a generator, applicable to a radial-axial type machine. The stator includes a plurality of stator segments disposed circumferentially about an axis. Each segment has a generally wedge shaped core and a winding wound around the core. The winding is bent to have portions that are disposed on multiple planes. The core includes an elongated wedge tip portions aligned parallel to the axis and an outer radial face opposite to the tip portion. The multiple planes include at least one plane substantially normal to the axis and at least one plane tangential to the radial face.

24 Claims, 5 Drawing Sheets

STATOR FOR PERMANENT MAGNET ELECTRIC MOTOR USING SOFT MAGNETIC COMPOSITES

FIELD OF THE INVENTION

The present invention relates to an electric motor, and more particularly, to a stator for a radial-axial flux type motor or generator.

BACKGROUND

In recent years, there has been a general reconsideration of using fossil fuels as a primary source of energy for transportation vehicles, due to environmental, economic and geopolitical issues. This reconsideration has squarely focused on the development of electric vehicle and hybrid electric vehicle platforms as possible solutions. These vehicles have only been given a serious look as a replacement to fossil fuel vehicles lately, mainly because of advancements in motor and electronics technology and battery technology.

Electrical motors can take two types of forms: DC motors or AC motors. DC motors have been developed and used extensively for a long period of time due to their high performance in motion and drive applications. However, with DC motors there are many maintenance and efficiency issues due to inclusion of slip rings and brushes that are needed to commutate these machines. With the more recent development of power electronics, new control technologies and machine topologies, great progress has been made to replace these DC machines in the variable speed drive area. AC motors are used to obtain better performance, reliability, improved maintenance characteristics, and overall lower costs. Extensive research and development has gone into developing AC machines that are suitable for drive applications and still match the drive characteristics of their DC counterparts.

AC motors are designed for use with either polyphase or single-phase power systems. AC motors are typically divided into these categories: series, synchronous, and induction motors. Induction motors, single-phase or polyphase, are the most commonly used type of AC motor and the name is derived from the fact that AC voltages are induced in a rotor circuit by rotating in a magnetic field of a stator. Currently, induction machines are the dominant choice for both constant speed and variable speed drives. However, induction machines also have difficulties. For instance, since rotor windings are present in all induction machines, the rotor current produces rotor resistive losses, decreasing the efficiency of the motor, particularly at low power ratings, and, in some cases, causing cooling problems.

In light of the drawbacks that are inherent in induction machines, more attention has been given to the permanent magnet machines which greatly increase power density and torque density. Even more power density is possible in such PM motor topologies as hybrid axial-radial motors (HARMs) having permanent magnets which providing fields in multiple planes. In these machines, the rotor field flux is established by permanent magnets. It is known in this field that high power and torque density as well as high efficiency are some of the most desirable characteristics for electrical machines. Improvements to these characteristics have been one of the main aspects of research on electrical machines in the last couple of decades.

Various implementations of hybrid axial-radial motors (HARMs) have been documented in U.S. Pat. No. 7,034,422 and in a paper by A. G. Jack, "Permanent-Magnet Machines with Powdered Iron Cores and Prepressed Windings," IEEE Trans. Industry Applications, vol. 36, no. 4, pp 1077-1084, Jul./Aug. 2000. In the paper, the stator winding is achieved through a toroidal type of winding, or a winding that is wrapped around a torrus-shaped stator. The '422 patent describes several HARM embodiments related to multiple stators and/or multiple rotors with the same or different machine types representing either the radial or axial portion of the HARMs. It also refers to the use of multiple machine types packaged into one radial-axial flux machine as a means of fault tolerance or reliability. The '422 patent describes a specific winding and stator geometry to enhance the overall performance of radial/Axial flux machines. However, there is still a need for highly efficient and power dense motors to make them a viable solution to various applications while the production and manufacturing cost remains low.

SUMMARY

In one embodiment, a stator of an electrical machine includes a plurality of stator segments disposed circumferentially about an axis, each segment having a generally wedge shaped core and a winding wound around the core, the winding being bent to have portions that are disposed on multiple planes. The core includes an elongated wedge tip portion aligned parallel to the axis and an outer radial face opposite to the tip portion. The multiple planes include at least one plane substantially normal to the axis and at least one plane tangential to the radial face.

In another embodiment, a method of operating a stator of an electrical machine that includes a plurality of stator segments disposed circumferentially about an axis, each segment including a generally wedge shaped core that has a radial face and a winding wound around the core, the winding being bent to have portions that are disposed on multiple planes, includes the step of providing electrical current to the winding to cause the portions to generate magnetic fluxes propagating in multiple directions normal to the multiple planes respectively. The multiple planes include at least one plane substantially normal to the axis and at least one plane tangential to the radial face.

DETAILED DESCRIPTION OF THE PREFERRED EMBODIMENTS

Broadly, the preferred embodiments describe a winding and stator design for a radial-axial machine, or hybrid axial-radial machine, that includes at least one axial flux air gap and at least one radial flux air gap. The stator includes a plurality of separate electromagnetic core segments that induce two axial flux fields as well as a radial flux field. The segments are formed of soft magnetic composite electromagnetic material, or any other material allowing the conduction of magnetic flux in multiple directions, on more surfaces and thereby increasing the power and torque density of the machine.

Figure 1:
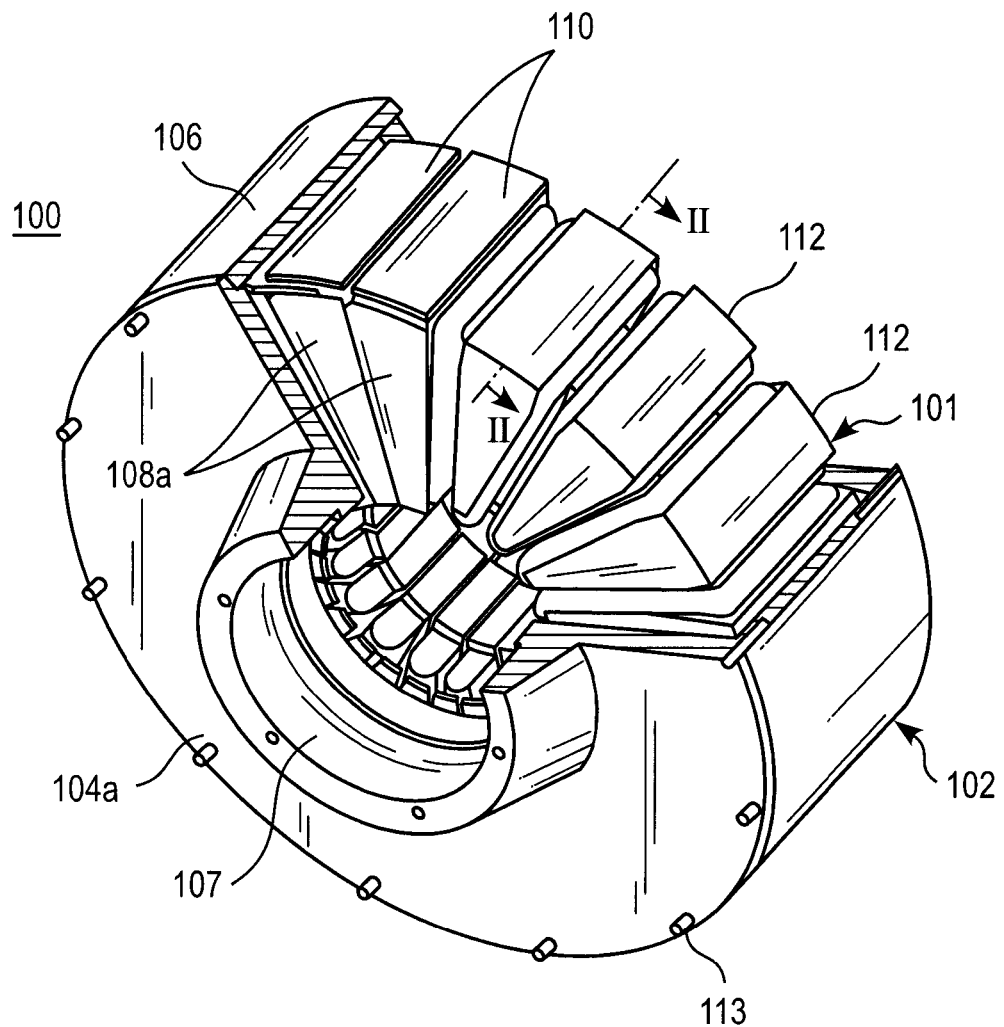
FIG. 1 shows a schematic partial cutaway view of a motor in accordance with one embodiment of the present invention.
Figure 2:
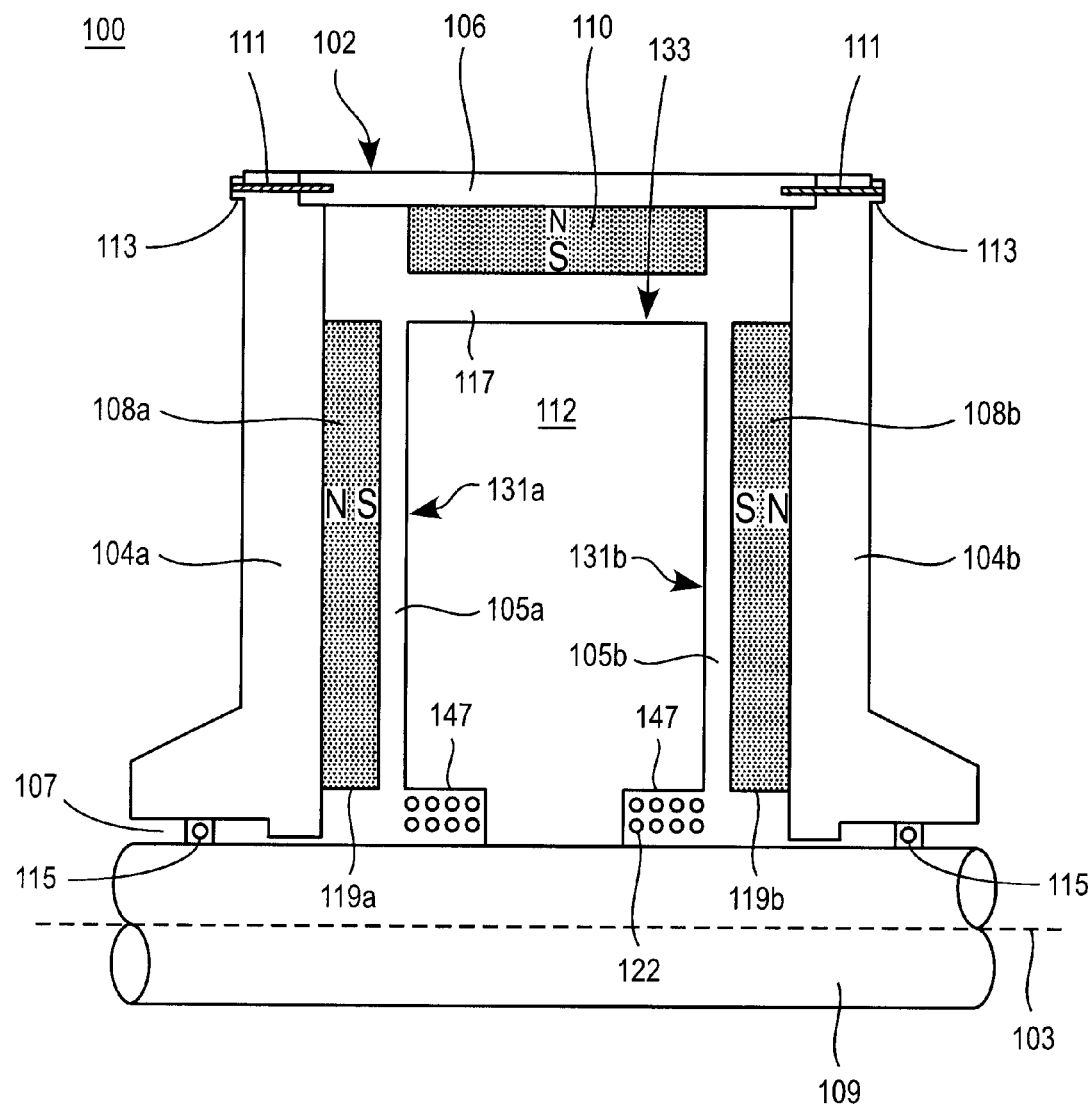
FIG. 2 shows a schematic cross sectional view of the motor in FIG. 1, taken along the line II-II.

FIG. 1 shows a schematic partial cutaway view of a motor 100 in accordance with one embodiment of the present invention. FIG. 2 shows a schematic cross sectional view of the motor 100, taken along the line II-II. As depicted, the motor 100, referred to as an inside-out motor or out-rotor motor, includes an outer rotor 102 set outside of a stator 101. The motor 100 is preferably an axial-radial motor or a hybrid-axial-radial motor (HARM).

The rotor 102 includes three components, two axial rotor hubs 104a, 104b, and one radial rotor case 106. The radial rotor case 106 has a generally hollow cylindrical shell shape. Each of the axial rotor hubs 104a, 104b includes a circular disk and a hollow conical frustum located at the center portion of the disk. The axial hubs 104a, 104b are secured by suitable fasteners 111 to the radial rotor case 106 such that the circular disks of the hubs are in a spaced-apart relationship with each other. Circular tubes 113 are formed in the rotor hubs 104a, 104b, wherein the fasteners 111 pass through the tubes 113. Each of the rotor hubs 104a, 104b includes a center hole or passageway 107 through which a center spindle 109 passes. The spindle 109 has a generally elongated cylindrical shape and an axis that is disposed along the rotational axis 103 of the rotor 102. The diameter of the spindle 109 may vary along the rotational axis 103. The rotor hubs 104a, 104b are rotatably mounted on the spindle 109 by bearings 115.

The stator 101 has a general ring shape and includes a plurality of stator segments 112 that are disposed circumferentially about the axis 103 around the center spindle 109 and secured in place with an epoxy resin, fasteners, locking features or any method that would maintain the mechanical integrity of the stator as required. Each stator segment 112 has a generally wedge shape, and each of the two principal wedge surfaces faces an adjacent stator segment 112. The elongated wedge tip portion 147 of the segment 112 (more specifically, the tip 147 of the core 128 in FIG. 3B) is aligned substantially parallel to the rotational axis 103 of the rotor 102. Each segment has two wedge-shaped axial faces 131a, 131b and a radial face 133 disposed opposite to the tip portion 147. Further detailed description of the stator segments 112 will be given with reference to FIGS. 3A-5.

Axial permanent magnets 108a, 108b are secured to the inner axial (or, lateral) surfaces of the disks of the axial rotor hubs 104a, 104b, wherein the disks are disposed substantially normal to the axis 103. Each of the axial magnets 108a, 108b is a generally wedge-shaped comparable to the wedge-shaped profile of the axial faces 131a, 131b of the stator segment 112. The axial magnets 108a, 108b are arranged such that the tip portions 119a, 119b of the axial magnets point to the axis 103. The polarities of adjacent axial magnets, say 108a, disposed on a rotor hub surface are arranged to be opposite to each other, i.e., the axial magnets 108a are arranged to have alternating polarities.

Each magnet 108a disposed on one axial rotor hub 104a has a counterpart axial magnet 108b disposed on the other axial rotor hub 104b, and the magnets 108a, 108b face the stator segment 112 with the same polarity. As such, the axial component of the force imparted to the segment 112 due to the interaction between the magnet 108a and the segment 112 is equal and opposite to the axial component of the force due to the interaction between the magnet 108b and the segment 112.

The magnets 108a, 108b can be secured to the rotor hubs 104a, 104b by various methods to ensure that the magnets will not move in high-speed rotational applications. For instance, high strength epoxies or glues are the preferred method. For another instance, sleeves or pockets formed in the inner surface of the rotor hubs 104a, 104b can also be used as a means to secure the magnets 108a, 108b to the rotor hubs. Segment to magnet pole ratios or otherwise known as slot-per-pole ratios can vary depending on the applications of the motor 100. In a preferred embodiment, there is a 0.75 Slot per Pole ratio, because it lowers the segment count for a more simple stator.

Figure 3A:
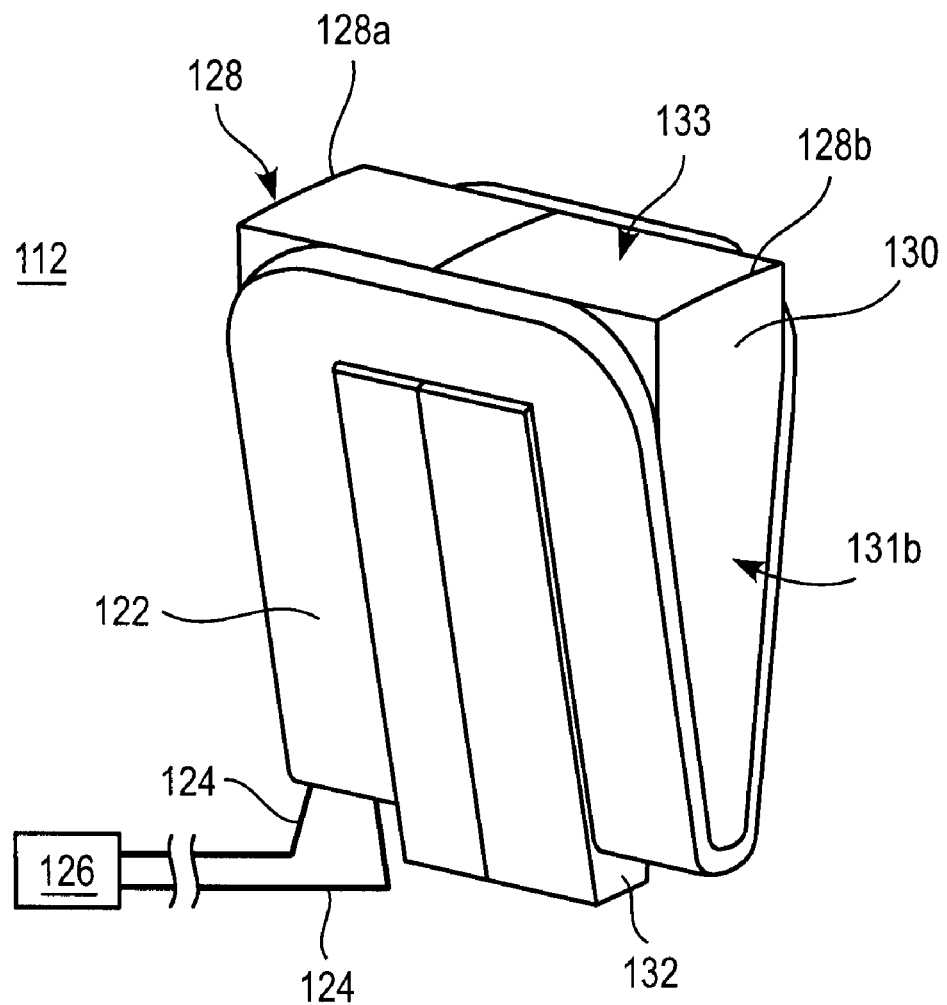
FIG. 3A shows a perspective view of a stator segment included in the motor of FIG. 1.

The axial magnets 108a, 108b are respectively separated from the axial or lateral faces 131a, 131b of the stator segments 112 by axial air gaps 105a, 105b, i.e., the axial magnets 108a, 108b are in a spaced-apart relationship with the axial faces 131a, 131b of the segments (more specifically, with the axial faces 131a, 131b of the cores 130 of the segment as depicted in FIG. 3A). An axial gap refers to a fluid filled volume, air or other fluid, where flux is conducted from the axial magnets 108a, 108b to the stator segments 112 or from the segments to the magnets thereacross. The axial flux crosses the axial air gaps 105a, 105b substantially parallel to the rotational axis 103 of the rotor 102. The axial magnets 108a, 108b interact with the magnetic flux generated by the segment 112 to impart rotational force to the rotor 102 during operation.

The radial rotor case 106, being a generally cylindrical shell, houses radial permanent magnets 110 that face the circumferential or radial surface 133 of the stator segments 112. Each of the radial magnets 110 has a rectangular plate or rectangular cylindrical shape and is dimensioned to follow the radial surface 133 of the stator segment 112. As in the case of axial magnets 108a, 108b, the radial magnets 110 can be secured to the radial rotor case 106 by various methods to ensure that the magnets will not move in high-speed rotational applications.

The polarities of adjacent radial magnets 110 are arranged to be opposite to each other, i.e., the radial permanent magnets are arranged to have alternating polarities. Also, the polarity of each radial magnet 110 is arranged such that a stator segment 112 surrounded by a radial magnet 110 and a neighboring pair of axial magnets 108a, 108b face the same polarities of the three magnets. The radial magnets 110 are separated from the radial faces 133 of the stator segments 112 by a radial air gap 117, i.e., the radial magnets 110 are in a spaced-apart relationship with the radial faces 133 of the segments 112. The radial magnets 110 interact with the magnetic flux generated by the segment 112 to impart rotational force to the rotor 102 during operation. The radial air gap 117 refers to a fluid filled volume, air or other fluid, where radial flux is conducted from the radial magnets 110 to the stator segments 112 or from the segments to the magnets thereacross The radial magnets 110 may be curved radially to follow the curvature of the radial faces 133. The radial flux crosses the radial air gap 117 substantially perpendicular to the rotational axis 103 of the rotor 102.

Figure 3B:
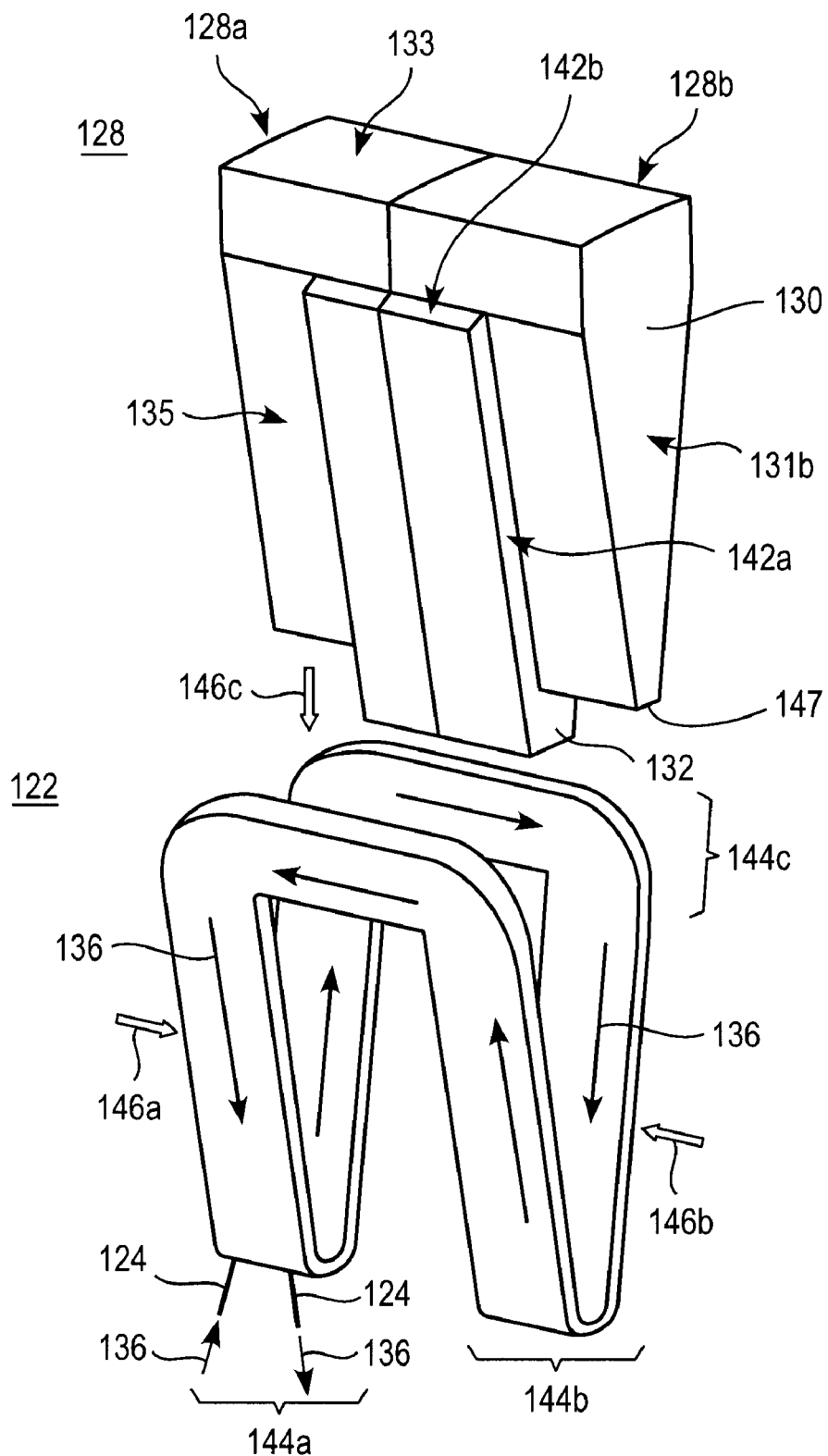
FIG. 3B shows an exploded view of the stator segment in FIG. 3A.
Figure 5:
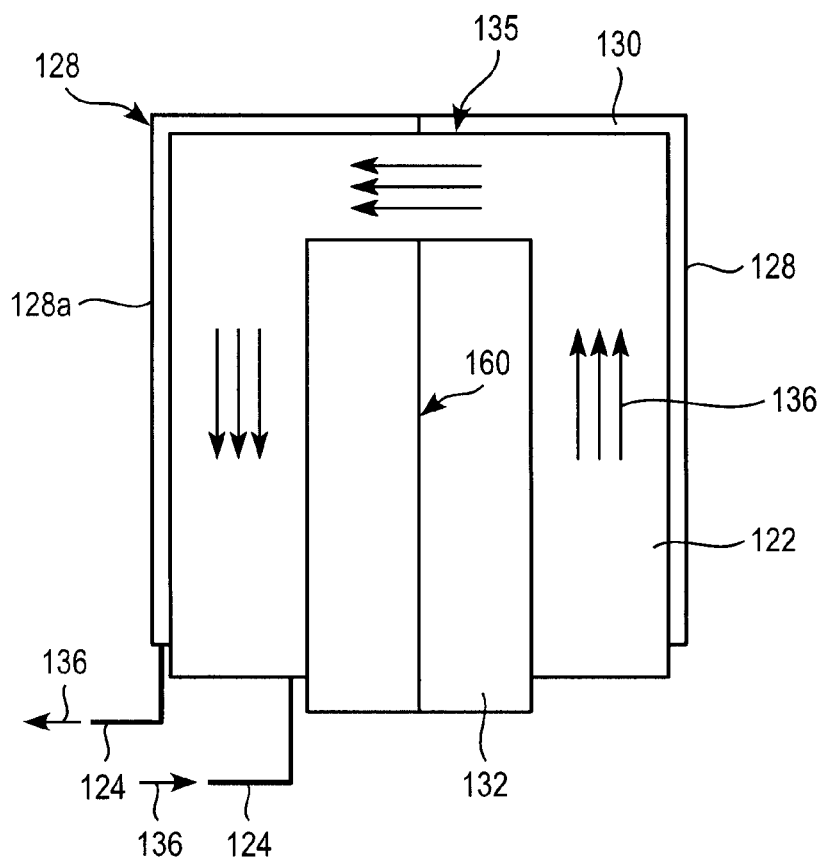
FIG. 5 shows a schematic side view of the stator segment in FIG. 3A.

FIG. 3A shows a perspective view of a stator segment 112 included in the motor 100. FIG. 3B shows an exploded view of the stator segment 112 in FIG. 3A. As depicted, the stator segment 112 includes a stator segment core 128 and a winding 122 wound around the core 128. The core 128 includes a wedge portion 130 and a V-shaped protrusion or winding rest 132. As depicted in FIG. 1, each stator segment 112 is arranged in the motor 100 such that the winding rest 132 is in contact with winding rests of two adjacent stator segments 112. The core 128 can be formed in one integral body or created by joining two half-segment pieces 128a, 128b together with a bonding agent as shown in FIGS. 3A-3B and 5.

The wedge portion 130 of the core 128, while looking at its axial (or lateral) face 131b, starts with a taper at the bottom tip portion 147 or the inner radius of the segment 112 and gradually get thicker toward the top or the radial face 133 of the segment. Thus, the radial face 133 is located on the opposite side of the elongated tip portion 147. The wedge portion 130 is a cylinder having a generally wedge-shaped cross section. The elongated wedge tip portion 147 of the wedge portion 130 is aligned substantially parallel to the axis 103 (FIG. 2). The wedge portion 130 also includes two principal wedge faces or side faces 135 and two axial faces 131a, 131b that are substantially parallel to each other and disposed substantially normal to the axis 103. The winding rest 132 provides axial winding surfaces 142a and radial winding surfaces 142b upon which the winding 122 rests. The winding rest 132 is a generally V-shaped protrusion when viewed in a direction normal to the axial face 131b and formed on the side faces 135.

The winding 122 includes three open loop portions: two axial portions 144a, 144b and a radial portion 144c. The axial portions 144a, 144b of the winding 122, which generate two axial magnetic fluxes along the directions 146a, 146b to respectively interact with the axial magnets 108a and 108b (FIG. 2) during operation, rest on the axial winding surface 142a and the side face 135 of the wedge portion 130, while the radial portion 144c of the winding 122, which generates a radial magnetic flux along the direction 146c to interact with the radial magnets 110 (FIG. 2) during operation, rests on the radial winding surface 142b and the side surface 135. The interaction between the magnets 108a, 108b, 110 with the fluxes generated by the winding 122 imparts rotational force to the rotor 102.

The two magnetic fluxes, which propagate in the two opposite directions 146a, 146b, respectively, pass through two parallel axial faces 131a and 131b, respectively. FIG. 3B shows an exemplary current 136 flowing through the winding 122. By the right hand rule, the three flux vectors 146a, 146b, and 146c would propagate inward to both of the axial faces 131a, 131b and the radial surface 133 as well. The faces 131a, 131b and 133 are where the axial and radial fluxes are generated from the stator. Faces 131a and 131b conduct axial fluxes from the windings 122 or the magnets 133.

The winding or winding loop 122, while looking at it from the axial face 131b of the segment 128, is generally V-shaped because it follows the wedge-shaped profile of the segment core 128. The winding 122 is also generally C-shaped, when viewed in a direction normal to the side surface 135. One or more electrically conductive wires 124, such as copper wires, are wound around the wedge portion 130 and winding rest 132 to form the winding 122.

The winding 122 is one that is bobbin wound or otherwise wound into a single planar winding loop and then bent in one or more places such that the open loop portions of the winding 122 define multiple planes, or equivalently are disposed on multiple planes. In the exemplary embodiment of the winding 122, the open loop portions 144a, 144b, 144c of the winding 122 define three planes; two planes parallel to the axial faces 131a, 131b and one plane tangential to the radial face 133. When an electrical current flows through the winding 122, the winding 122 induces fluxes in three major directions, 146a, 146b, and 146c, that are respectively normal to the three planes. The open loop portions 144a-144c of the winding 122 are arranged such that the fluxes propagating along the directions 146a, 146b, and 146c respectively cross the axial air gaps 105a, 105b, and 117 (FIG. 2). As depicted in FIG. 2, all winding loop faces are arranged along the outer periphery of the stator 101, unlike the a more typical torroidal winding where the loops are wound such that they span the outer periphery to the inner periphery of the stator.

The winding 122 can be formed, or wound in place such that it forms a shape that induces magnetic fluxes in multiple directions. The winding 122 can be comprised of multiple winding turns and multiple wires or multiple electrical current carrying conductors comprising each turn. The winding 122 is also known as a concentrated winding or a single tooth winding. In one exemplary embodiment, while looking at the winding 122 from the perspective view of FIG. 3B, the winding begins at the bottom left side of the segment core 128 and is carried around the axial and radial winding surfaces 142a, 142b on one side surface 135, back down the right side of the segment core and continuing the similar path on the opposite side surface 135 to complete one turn. This winding procedure is repeated to the specifications required for a motor design and the leads or wires 124 of the winding 122 are terminated on the same side or conversely on opposite sides of the segment core 128. For instance, in FIG. 3B, the wires 124 are terminated on the same side of the core 128.

The same winding shape can be achieved by winding one or more electrically conductive wires around a jig or other apparatus such that a single loop area is formed to provide multiple planes as the wires are wound. Both ends of the wires 124 are coupled to an electrical power source 126 that transmits electrical current 136 in a single or poly phase through the winding 122. The wedge portion 130 carries magnetic flux analogous of the teeth in the stator of a conventional machine. The material between surfaces 142a, 142b and 132 carries flux normal to surface 160 to conduct flux between segments analogous to the conduction of flux through the stator back iron to adjacent teeth as in a conventional stator.

The segment core 128 can be formed of soft magnetic composite electromagnetic materials (or other magnetically isotropic material), allowing the conduction of magnetic flux in multiple directions. These soft magnetic permeable materials include Fe, SiFe, SiFeCo, NiFe or SiFeP, for example, and have a unique power loss, permeability and saturation level. Alternatively, the same general winding shape described above can be utilized without core material in an air core configuration. In this case the material described above as the core would become small or non-existent compared to the space consumed by the winding. Rare earth magnets like Neodymium Iron Boron (NdFeB) may be used in the rotor to achieve a higher efficiency and achieve the high air gap flux density and high torque density.

Preferably, a conventional powder metallurgy technique is used to manufacture the segment core 128. For instance, the segment core 128 is manufactured by filling the soft magnetic powder composite material into a die, pressing the material in the die, and then heat-treating at a temperature below the threshold of damaging the included insulating layer between the powder particles. The segment core 128 may be pressed in half pieces 128a, 128b and the final shape of the segment will be created by joining two half-segment pieces together with a bonding agent. Alternatively, the segment core 128 may be formed as a single integral body in a die.

The segment core 128, being formed of soft magnetic permeable material, has a three-dimensional magnetic flux distribution along with a lower component count. More specifically, the segment core 128 can induce two axial flux fields as well as a radial flux field. The increased surface area utilized by these multiple flux fields can be used to create a high torque motor that is capable of higher torque than motors of its comparable size without additional gearing or increased packaging, thereby enhancing torque density and power efficiency of the motor 100.

Figure 4:
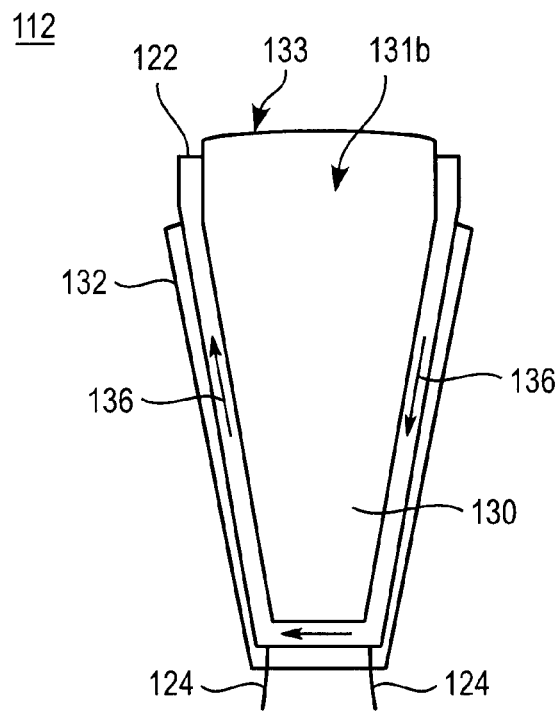
FIG. 4 shows a schematic axial view of the stator segment in FIG. 3A.

FIG. 4 shows a schematic axial view of the stator segment 112 in FIG. 3A, taken in a direction normal to the axial face 131b. As depicted, the winding 122 is generally V-Shaped because it follows the wedge-shaped profile of the wedge portion 130. The axial face 131b is generally a wedge shaped surface where the axial flux propagating in the direction 146b (FIG. 3B) is conducted across the axial airgap. The stator segment core 128, which includes the wedge portion 130 and winding rest 132, also possesses two axial faces 131a, 131b that are substantially parallel to each other.

The electrical current 136 flowing through the winding 122 generates two fluxes propagating in opposite directions 146a and 146b (FIG. 3B). By the right hand rule, the magnetic fluxes would propagate inward to both of the axial faces 131a, 131b and the radial face 133 as well. It is noted that the current 136 may flow in the opposite direction at a different point in time. In such a case, by the same right hand rule, the magnetic fluxes would propagate outward from both of the axial faces 131a, 131b and the radial face 133 as well.

FIG. 5 shows a schematic side view of the stator segment unit in FIG. 3A, taken in a direction normal to the side face 135. As depicted, two segment core halves 128a and 128b are joined together with a bonding agent to form the core body 128, wherein each segment half is manufactured by a conventional powder metallurgy technique. This bonding approach is chosen for this embodiment as an enabler of manufacturing for the Soft Magnetic Composite (SMC) powder compaction process. In similar designs or using other isotropic materials, the segment core 128 can be formed in a single integral body. The bonding agent needs to be strong enough to hold the segment halves 128a, 128b as one integral body under a typical mechanical load for the application for which the motor 100 is designed.

The segment halves 128a, 128b are joined at a surface 160 that is substantially parallel to the axial faces 131a, 131b and passes through the center of the segment 128. The halves 128a, 128b are symmetric with respect to the surface 160. Depending on the motor characteristics, the dimensions and shape of the segment core 128 are varied to meet the needs of a particular application.

As depicted in FIG. 5, the electrically conductive wire(s) 124 is wound in such a way that a continuous loop is created around the segment core 128. If the winding 122 were to be removed from the segment core 128 and flattened, it would have rectangles forming a C-shape. As discussed above, while looking at the winding 122 from the side surface 135 of the core 128, the winding 122 is formed by repeatedly making turns to the specifications required for a motor design, wherein each turn begins at the bottom left side of the segment core 128 and is carried around the axial and radial winding surfaces 142a, 142b on one side surface 135, back down the right side of the segment core and continuing the similar path on the opposite side surface 135. The winding 122 is then pressed into place after or during the winding process such that they do not protrude past any of the surfaces of the segment core 128. The winding 122 may be held in place with an encapsulation material before final assembly.

It is noted that the exemplary embodiment 100 has been described as a motor. However, the embodiment 100 may be used as generator, i.e., electrical current can be generated and transmitted through the wires 104 when the rotor 102 is rotated with respect to the stator 101 by an external force.

While the invention has been described in detail with reference to specific embodiments thereof, it will be apparent to those skilled in the art that various changes and modifications can be made, and equivalents employed, without departing from the scope of the appended claims.

What is claimed is:

1. An electrical machine that includes a stator, the stator comprising:
   a plurality of stator segments disposed circumferentially about an axis, each said segment having a generally wedge shaped core and a winding wound around said wedged shaped core, said winding being bent to have portions that are disposed on multiple planes, said core including an elongated wedge tip portion aligned parallel to said axis and an outer radial face opposite to said tip portion,
   wherein said multiple planes include at least one segment extending substantially normal to said axis and at least one segment proximal to said radial face and arranged between the outer radial face and the axis such that magnetic flux can be conducted from the outer radial face to adjacent radially positioned magnets on a rotor,
   wherein the winding is wound such that it extends around the wedge tip portion so that the winding exists on opposite sides of the core.

2. The electrical machine as recited in claim 1, wherein said core includes a wedge portion that has two principal wedge faces, two axial faces that are substantially parallel to each other and normal to said axis, said elongated tip portion, and said radial face and wherein said multiple planes are respectively parallel to said two axial faces and tangential to said radial face.

3. A stator for an electrical machine, comprising:
   a plurality of stator segments disposed circumferentially about an axis, each said segment having a generally wedge shaped core and a winding wound around said wedged shaped core, said winding being bent to have portions that are disposed on multiple planes, said core including an elongated wedge tip portion aligned parallel to said axis and an outer radial face opposite to said tip portion,
   wherein said multiple planes include at least one plane substantially normal to said axis and at least one plane proximal to said radial face,
   wherein said core includes a wedge portion that has two principal wedge faces, two axial faces that are substantially parallel to each other and normal to said axis, said elongated tip portion, and said radial face and wherein said multiple planes are respectively parallel to said two axial faces and tangential to said radial face,
   wherein said core further includes a winding rest that is a generally V-shape protrusion formed on said two principal wedge faces and wherein said winding is wound around said winding rest.

4. The stator as recited in claim 3, wherein said winding is a single winding with multiple turns around said winding rest.

5. The stator as recited in claim 3, wherein said winding includes one or more electrically conductive wires.

6. The stator as recited in claim 5, wherein each of said conductive wires is operative to carry an electrical current during operation.

7. The electrical machine as recited in claim 2, further comprising a rotor having a plurality of radial permanent magnets that are disposed circumferentially about said axis and radially outside said segments, each said radial permanent magnet being arranged in a spaced-apart relationship with said radial face by a radial air gap.

8. The electrical machine as recited in claim 7, wherein said radial permanent magnets are arranged to impart rotational force to said rotor by interacting with magnetic flux that propagates substantially normal to a plane parallel to said radial face.

9. The electrical machine as recited in claim 7, wherein said radial permanent magnets are arranged to have alternating polarities.

10. The electrical machine as recited in claim 7, wherein said rotor has two circular disks disposed substantially normal to said axis and two sets of axial permanent magnets respectively disposed on said two disks, each said set of axial permanent magnets being disposed circumferentially about said axis and arranged in a spaced-apart relationship with one of said axial faces by an axial air gap.

11. The electrical machine as recited in claim 10, wherein said axial permanent magnets are arranged to impart rotational force to said rotor by interacting with magnetic flux substantially normal to one of said axial faces.

12. The electrical machine as recited in claim 10, wherein each said set of axial permanent magnets are arranged to have alternating polarities.

13. The electrical machine as recited in claim 10, wherein each of said axial permanent magnets has a generally wedge shape and a tip pointing to said axis.

14. The electrical machine as recited in claim 7, further comprising a spindle having a generally elongated cylindrical shape and a rotational axis disposed along said axis and wherein said stator segments are fixedly mounted to said spindle and said rotor is rotatably mounted to said spindle.

15. A stator for an electrical machine, comprising:
a plurality of stator segments disposed circumferentially about an axis, each said segment having a generally wedge shaped core and a winding wound around said wedged shaped core, said winding being bent to have portions that are disposed on multiple planes, said core including an elongated wedge tip portion aligned parallel to said axis and an outer radial face opposite to said tip portion,
wherein said multiple planes include at least one plane substantially normal to said axis and at least one plane proximal to said radial face,
wherein said core includes a wedge portion that has two principal wedge faces, two axial faces that are substantially parallel to each other and normal to said axis, said elongated tip portion, and said radial face and wherein said multiple planes are respectively parallel to said two axial faces and tangential to said radial face,
wherein said winding has a generally C-shape when viewed in a direction normal to one of said principal wedge faces and a generally V-shape when viewed in a direction normal to one of said axial faces.

16. The electrical machine as recited in claim 1, wherein said core includes two half pieces attached to each other.

17. The electrical machine stator as recited in claim 1, wherein said core is formed of magnetically isotropic material.

18. The electrical machine as recited in claim 17, wherein said magnetically isotropic material is soft magnetic composite electromagnetic material.

19. The electrical machine as recited in claim 1, wherein said electric machine is a motor or a generator.

20. A stator segment for a stator in an electrical machine, the stator segment comprising:
a generally wedge shaped core having an elongated wedge tip portion, an outer radial face opposite to said wedge tip portion, and two principal faces interconnecting the tip and the outer radial face; and
a winding wound around said wedge shaped core, said winding being bent to have portions that are disposed on the two principal planes, across the wedge tip, and on a plane proximal to the outer radial face and arranged between the outer radial face and the wedge tip portion such that magnetic flux can be conducted from the outer radial face to adjacent radially positioned magnets on a rotor.

21. A stator segment for a stator in an electrical machine, the stator segment comprising:
a generally wedge shaped core having an elongated wedge tip portion, an outer radial face opposite to said tip portion, and two principal faces interconnecting the tip and the radial face; and
a winding wound around said core, said wedge shaped winding being bent to have portions that are disposed on the two principal planes and across the wedge tip,
wherein said core further includes a winding rest that is a protrusion formed on said two principal wedge faces and wherein said winding is wound around said winding rest.

22. A stator segment winding for a stator in an electrical machine, the stator segment winding comprising:
a continuous coil having two parallel V-shaped portions, wherein each V-shaped portion has a pair of legs, each of the legs having a divergent end and a convergent end, the two legs of each pair being interconnected at the convergent ends;
the divergent end of one leg of one of the portions being connected to a divergent end of one leg in the other portion, and the divergent end of the other leg of the one portion being connected to a divergent end of the other leg of the other portion.

23. A method of operating an electrical machine that includes a stator having a plurality of stator segments disposed circumferentially about an axis, each said segment including a generally wedge shaped core that has an outer radial face and a winding wound around said wedge shaped core, said winding being bent to have portions that are disposed on multiple planes, said method comprising:
providing electrical current to said winding to cause said portions to generate fluxes propagating in multiple directions normal to said multiple planes respectively,
wherein said multiple planes include at least one segment extending substantially normal to said axis and at least one segment proximal to said radial face and arranged between the outer radial face and the axis such that magnetic flux can be conducted from the outer radial face to adjacent radially positioned magnets on a rotor,
wherein the winding is wound such that it extends around the wedge tip portion so that the winding exists on opposite sides of the core.

24. The method of claim 23, wherein said directions are simultaneously pointing toward said core or away from said core.

* * * * *